United States Patent [19]

Burchill et al.

[11] Patent Number: 5,237,045
[45] Date of Patent: Aug. 17, 1993

[54] CURING PHTHALONITRILE RESINS WITH ACID AND AMINE

[75] Inventors: Peter J. Burchill, Melbourne, Australia; Teddy M. Keller, Alexandria, Va.

[73] Assignee: The United States of America as represented by the Secretary of the Navy, Washington, D.C.

[21] Appl. No.: 818,575

[22] Filed: Jan. 9, 1992

[51] Int. Cl.$^5$ .............................................. C08G 73/00
[52] U.S. Cl. .................................. 528/362; 528/171; 528/172; 528/173; 528/183; 528/188; 528/206; 528/207; 528/208; 528/337; 528/352; 528/353
[58] Field of Search ............... 528/362, 183, 188, 171, 528/172, 173, 206, 207, 208, 337, 352, 353

[56] References Cited
U.S. PATENT DOCUMENTS 4,408,035 10/1983 Keller .................................. 528/183
4,410,676 10/1983 Keller .................................... 528/9

OTHER PUBLICATIONS

U.S. patent application entitled "Curing Phthalonitriles With Acid" of T. Keller, Ser. No. 07-818,672, filed Jan. 9, 1992.

Primary Examiner—Harold D. Anderson
Attorney, Agent, or Firm—Thomas E. McDonnell; George A. Kap

[57] ABSTRACT

Polymerization or cure of di-phthalonitrile monomers or prepolymers by a curing agent selected from (a) an acid and an amine, (b) a salt of an acid and an amine, and (c) mixtures of (a) and (b). In a preferred embodiment, the curing agents are amine salts which are reaction products of an aromatic amine and an aromatic sulfonic acid. The use of the novel curing agents enhances curing rates and results in polymers which have high Tg.

17 Claims, No Drawings

CURING PHTHALONITRILE RESINS WITH ACID AND AMINE

BACKGROUND OF THE INVENTION

The invention relates generally to high temperature polymers and in particular to phthalonitrile polymers and their cures. More specifically, the present invention relates to di-phthalonitrile polymers cured with the curing agents described herein, to methods of curing di-phthalonitrile monomers to produce phthalonitrile resins with high temperature properties, and to the phthalonitrile prepolymers produced by the methods herein. The curing agents are selected from the group consisting essentially of (a) an acid and an amine, (b) salts of an acid and an amine, and (c). and mixtures of (a) and (b).

It is known that di-phthalonitrile monomers polymerize to produce thermally stable phthalonitrile resins. There is an extensive range of applications for such phthalonitrile resins including as matrix materials for lightweight high temperature resistant carbon fibre composites for use in aircraft engine nacelles, as binding filler suitable for use in clutch or brake linings, and in hot molds for casting.

Interest in fiber-reinforced composites for advanced aerospace applications has led to the search for high-temperature polymers that are easily processed and exhibit high thermal and oxidative stability. Epoxies and polyimides are now being used but each has its disadvantages. Conventional epoxy-based composites and adhesives have a 200° C. maximum service limit and polyimide resins used in composites matrices have a 300° C. maximum service limit. Advanced design concepts, especially in the aerospace industry, demand even higher temperature requirements for polymeric materials.

A major problem of the polyimide system is the inability to process void- and blister-free components in high yield because of the evolution of volatile components formed during the polymerization. Other problems associated with both polyimides and epoxies include their brittleness, water absorptivity and engineering reliability.

Phthalonitrile resins are proving to be superior in physical and chemical properties to epoxies, polyimides and other plastics as matrices for fiber-reinforced composites and in other applications. A major advantage of phthalonitrile resins, compared to other plastics, is their ability to withstand temperatures in excess of 300° C. for extended periods without permanent damage to the coatings, plastics or composites made therefrom. Such resins usually contain a substantial proportion of aromatic structures, but cured polymers composed solely of aromatic rings tend to be brittle and intractable. A resin having flexible linkages between the aromatic rings minimizes or greatly reduces brittleness and intractability. Polyphthalonitrile resins with diether linkages are materials which meet these goals. Examples of these polyphthalonitriles and other polyphthalonitriles are disclosed in the prior art.

One known method of polymerising di-phthalonitrile monomers comprises curing the monomers with metals and metal salts which act as reducing agents to promote the polymerization reaction. However, the phthalonitrile resins produced by this method are not as thermally stable as is required for many applications and there are processing problems associated with the method which are difficult to overcome. For example, a large quantity of metals or metal salts are required for complete reaction.

Another known method of polymerizing di-phthalonitrile monomers comprises curing the monomers at temperatures greater than 300° C. for in excess of several days. The curing time is unacceptably long from the commercial viewpoint.

A known improvement to accelerate the curing time, disclosed in U.S. Pat. Nos. 4,408,035 and 4,410,676 assigned to the United States of America as represented by the Secretary of the Navy, comprises adding a curing additive in the form of small amounts of an active hydrogen source, such as primary amines and phenols, to di-phthalonitrile monomers. For example, U.S. Pat. No. 4,408,035 discloses a method comprising curing a mixture of di-phthalonitrile monomers and a nucleophilic aromatic amine in molar ratio of monomer to amine of 40:1 at a temperature in excess of 200° C. for 24 hours and at 315° C. for a further 24 hours. The resultant phthalonitrile resin, the monomer of which had melting point of 232°–234° C., had good thermal stability and a relatively high glass transition temperature exceeding 200° C. The aromatic diamines covered by U.S. Pat. No. 4,408,035 are somewhat volatile at the required processing temperature and can cause void problems when used in an amount greater than 5% by weight. It is advantageous for a resin not to produce gaseous products on curing.

SUMMARY OF THE INVENTION

It is an object of the present invention to reduce the curing time required to polymerise phthalonitrile monomers.

It is an object of this invention to produce a polymeric material which minimizes voids.

It is an object of this invention to produce materials for composite matrices for use in applications where the operating temperature is above the operating temperature of conventional high temperature polymers.

It is an object of this invention to produce phthalonitrile resins which are thermally and oxidatively stable and have good mechanical properties at temperatures in excess of 300° C.

It is an object of this invention to increase glass transition temperatures of phthalonitrile resins.

These and other objects are accomplished by polymerizing di-phthalonitriles with a curing agent selected from (a) one or more acids and one or more amines, (b) salts of an acid and an amine, and (c) mixtures of (a) and (b).

DETAILED DESCRIPTION OF THE INVENTION

Any di-phthalonitrile monomer capable of forming polymeric materials can be polymerized with the novel curing agents disclosed herein. The novel curing agents are especially useful for the polymerisation of highly aromatic di-phthalonitrile monomers.

The advantages of this invention are best realized in connection with polymerisation of di-phthalonitrile monomers which are devoid of active hydrogen atoms. Such monomers are represented by the following formula which can be substituted or unsubstituted:

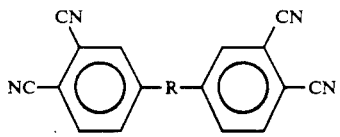

where R is a bridge preferably containing a bisphenol group, a diether group or a polyether, a dithioether group, an amide group, an imide group, an —SAS— group wherein A is an aliphatic hydrocarbon group; an ether group; an ether and imide group, a sulfone group, a halogenated hydrocarbon group, an oxyaromatic group, and a carboxyl group. In a more preferred embodiment, R is a bridge selected from bisphenol containing no or at least one halogen substituent; diethoxy containing intermediate imide and tetravalent aromatic radicals; diethoxy of —OR'O— formula where R' is —ArC$_n$H$_{2n}$Ar—, 1 to 10 —Ar—, —ArC$_3$F$_6$Ar—, —C$_n$H$_{2n}$—, —ArAr—, —ArSO$_2$Ar—, and —ArCOAr—, where n is an integer of 2–30, more preferably 6–20 and Ar represents an aromatic, more preferably phenylene group; diethoxy containing intermediate polysulfone and polyphenylene radicals; and alkylene hydrocarbons containing fluorine substituents separated by oxygen atoms.

Examples of the di-phthalonitrile monomers are given in U.S. Pat. Nos. 3,730,946; 3,763,210; 3,787,475; 3,869,499; 3,972,902 and particularly the monomers described in U.S. Pat. Nos. 4,209,458; 4,223,123; 4,226,801; 4,234,712; 4,238,601; 4,304,896; 4,315,093; 4,351,776; 4,409,782 and 5,003,078. All of these references are incorporated herein for their disclosure of the monomers which can be polymerised with the Curing agents disclosed herein.

Examples of specific di-phthalonitrile monomers described herein include bis (3,4-dicyanophenyl -2- tetrafluoroethoxy) -1,5-perfluoropentane, bis (3,4-dicyanophenyl)hexene, bis (3,4-dicyanophenyl) ether of bisphenol A or bisphenol S, bis (3,4-dicyanophenyl) ether of 4,4'-dihydroxybenzophenone, bisorthodinitrile of hexafluoroacetone bisphenol A, 4,4'-bis(3,4-dicyanophenoxy) diphenyloxide, 2,7-bis(3,4-dicyanophenoxy) naphthalene, 1,3-bis(3,4-dicyanophenyl) oligomeric polyarylether sulfone phthalonitrile monomer, 1,3 or 1,4-bis(3,4-dicyanophenoxy)benzene, imide-containing di-phthalonitrile from 3,3',4,4'-benzophenonetetracarboxylic dianhydride and 4-(3-aminophenoxy) phthalonitrile, 4,4'-(hexafluoroisopropylidene) diphthalic anhydride, and 4,4'-bis(3,4-dicyanothiophenoxy) biphenyl.

The curing agent suitable herein is selected from (a) an acid and an amine, (b) a salt of an acid and an amine, and (c) mixtures of (a) and (b).

Suitable amines are selected from the group of primary amines, secondary amines, amidines, and mixtures thereof. Amidines contain the radical —C:NH.NH$_2$ and are derived from amides by replacement of the oxygen atom "0" by amido residue =NH or =NR. The dicompounds are of particular interest herein and contain two amidine groups.

Other suitable amines to be used in the curing agent disclosed herein include aromatic primary amines, aromatic secondary amines, and bis compounds thereof; benzamidines, and mixtures thereof. Particularly, preferred amines include bis(3-aminophenoxy)-1,3-benzene, aniline, p-phenylene diamine, bis(4-aminophenyl)methane, benzamidine, n-phenylbenzamidine, 4,4'-diaminodiphenylmethane, 4,4'-diaminodiphenylsulfone, 4,4'-diaminonaphthalene, sulfide, 4,4'-diaminodiphenyl ether, 1,5-diaminonaphthalene, 3,3'-dimethylbenzidine, 3,3'-dimethoxybenzidine, 2,4-bis($\beta$-amino-t-butyl)toluene, bis(p-$\beta$-amino-t-butyl)ether, bis(p-$\beta$-methyl-o-aminopentyl)benzene, 1,3-diamino-4-isopropylbenzene, 1,2-bis(3-aminopropoxy)ethane, benzidine, m-xylylenediamine, and 2,4-diaminotoluene.

The acids that can be used separately with the amines or reacted with the amines to form curing agents include organic and inorganic acids, but excluding phenol particularly strong inorganic acids and aromatic organic acids. Strong inorganic acids include hydrochloric, sulfuric, phosphoric, nitric, and mixtures of strong inorganic acids. Although nitric acid is a strong acid, it is not a preferred acid because it is also a strong oxidizing agent. Aromatic acids which can be reacted or be used with amine to form a curing agent salt herein include aromatic organic acids containing at least one inorganic substituent, particularly the sulfonic group —SO$_3$H. Specific examples of such aromatic acids include p-toluenesulfonic acid and other toluenesulfonic acids, phenylsulfonic acid, 1-naphthalenesulfonic acid, 2-naphthalenesulfonic acid, 1,5-naphthalenedisulfonic acid, 2,6-naphthalenedisulfonic acid, 2,7-napthalenedisulfonic acid, phenylphosphonic acid, phenylphosphinic acid, and phenylboric acid.

Specific curing salts of this invention for polymerizing di-phthalonitriles include bis(3-aminophenoxy)-1,3-benzene p-toluene sulfonate, p-phenylenediamine p-toluenesulfonate, bis(4-aminophenyl)methane hydrochloride, and N-phenylbenzamidine p-toluene sulfonate.

An effective amount of the curing agent is to be used. Generally, the more curing agent that is used, the quicker is the cure. The molar amount of the curing agent relative to the monomer is 0.1–40%, preferably 1–20% and especially about 5–15%

A residue of the curing agent ca remain after the polymer is formed. Amount of this residue is at a trace level since it is desired to have as little as possible of the unreacted curing agent in the polymer. The Tg of the polymer obtained with the curing agent disclosed herein is at least 250° C., preferably above 300° C.

It is possible with the present invention to include a metal or metal salt in the monomers or polymers in amount of 1–40% by weight of the monomer, preferably 1–10%. For composite fabrication, a metal salt or a metal would be less desirable because of problems with homogeneity and gasing. Mixtures of these metals and metal salts may also be used. The preferred metals are copper, silver and iron.

It is within the scope of this invention to mix a di-phthalonitrile monomer with a curing agent prior to polymerization of the monomer. Pursuant to this procedure, the curing agent can be separately mixed with a di-phthalonitrile monomer at a temperature below the decomposition temperature of the resin or polymer at which temperature the mixture is molten for a time sufficient to cure or polymerize the monomer to form the resin or polymer as evidenced by increased gelation or increased viscosity or reduction in time to gelation.

Generally, the polymerization reaction is performed by heating the monomer and the curing agent to a temperature in the range from about its melting point to about its decomposition temperature, and mixing the curing agent in an effective amount. The preferred initial heating is at a temperature above the melting temperature of the monomer but below its decomposition temperature for 1 to 28 hours. The most preferred initial heating is within about 50° C. above the melting temperature of the monomer for 14 to 26 hours. Initial heating is followed by more drastic heating or post-curing at 280° to 340° C. for 5 to 28 hours, preferably at 300° to 320° C. for 10 to 24 hours.

Alternatively, the curing agent and the monomer can be heated to any viscosity desired by a fabricator and quenched at a stage before gelation occurs. The resulting prepolymer can be stored indefinitely at room or ambient temperature without further reaction. When needed, the prepolymer can be processed above the glass transition temperature, which has been greatly suppressed relative to the original melting point of the monomer. The cure cycles for the prepolymer would be the same as those recommended above. The stability of the prepolymer at ambient temperature is particularly appealing for the preparation of prepregs and their applications as laminates for fiber-reinforced composites.

By this invention, di-phthalonitrile monomers are quickly cured with minimum amount curing agent. The cured resin or polymer has very high glass transition temperature (Tg). The higher Tg allows the resins or polymers herein to be used at higher service temperature. This is in keeping with the ever-present objective of extending the service temperature and making application of the resins herein more universal.

Theory of operation of this invention is presented below. Theory of operation at least partly attempts to explain why this invention works in the particular way to produce the advantages disclosed above.

U.S. Pat. No. 4,408,035 discloses the use of an amine as a curing additive for the polymerization of di-phthalonitrile monomers. The paragraph bridging columns 2 and 3 of the patent proposes that polymerization in the presence of primary amines probably proceeds via an intra-molecular cyclization reaction to yield a poly-(isoindoleine) and other complex polymerization products. This theory is based on the known reaction of phthalonitrile with amines to give N-substituted 1-amino, 3-amino-isoindoleines, and is also consistent with known reactions producing phthalocyanines via an intra-molecular cyclization.

However, it has been determined that a poly(isoindoleine) is not formed as a major product during polymerization as proposed in accordance with U.S. Pat. No. 4,408,035. It has been found through infra-red spectroscopy that up to 30% of the nitrile groups of di-phthalonitrile monomers remain unreacted during polymerisation and that the reaction product is principally a polytriazine although the presence of poly(carbimine) chains and other complex polymerization products is not precluded.

The following represents experimental work on di-phthalonitrile resins produced in accordance with prior art and in accordance with a preferred embodiment of the present invention.

EXAMPLE 1

This example represents experimental work carried out pursuant to U.S. Pat. No. 4,408,035 to polymerize a di-phthalonitrile monomer using an amine.

A 75 gram (gm) amount of di-phthalonitrile monomer bis(3,4-dicyanophenoxyl)-4,4'-biphenyl was degassed at 250° C. for 4 hours in a vacuum. A 1.13 gm amount of amine 1,3-bis(3-aminophenoxy) benzene was then added to the molten monomer and the mixture was held at a temperature below 250° C. and stirred. Amount of the amine corresponds to a molar ratio of monomer to amine of 40:1. After 15 minutes, the mixture was poured into pre-heated specimen molds and degassed for 15 minutes in a vacuum oven. The molds were then placed in an air circulating oven for 24 hours at 240° C. and for a further 24 hours at 315° C. The molds were then slowly cooled to room temperature.

EXAMPLE 2

This example demonstrates the invention herein wherein a di-phthalonitrile monomer was cured using an amine salt.

A 75 gm amount of bis(3,4-dicyanophenoxyl)-4,4'-biphenyl was degassed at 250° C. for 4 hours in a vacuum. An amount of the amine salt p-phenylenediamine - p-toluenesulfonate was then added to the molten monomer and the mixture was kept at a temperature of 260°–270° C. for 30 minutes while stirring. The amount of the amine salt was selected to correspond to a molar ratio of monomer to amine salt of 100:1. The mixture was poured into pre-heated specimen molds and degassed for 15 minutes in a vacuum oven. The molds were then placed in an air circulating oven for 16 hours at 240° C. and for 7 hours at 315° C. The molds were then slowly cooled at room or ambient temperature.

Mechanical properties of the resins produced in Ex. 2, above, were determined by a series of double torsion experiments at 24° C., 200° C. and 250° C. Results of the experiments are set forth in the following table:

|  | 24° C. | 200° C. | 250° C. |
|---|---|---|---|
| K(MNm$^{-3/2}$) | 0.82 | 0.65 | 0.82 |
| G(Jm$^{-2}$) | 164 | 127 | 236 |
| E(GPa) | 4.1 | 3.3 | 2.9 |

It is noted that at 250° C. the fracture mechanism for the double torsion resins is stick-slip, and the quoted values in the above table are for crack initiation.

Polymerization of the di-phthalonitrile monomers prepared pursuant to Examples 1 and 2, above, was monitored by measurement of the glass transition temperature (Tg) against time. The Tg was determined by the measurement of the coefficient of expansion variation with polymerisation or curing temperature.

While most resins prepared pursuant to Ex. 1 recorded a Tg of about 240° C. after completion of the cure schedule, however, occasionally, Tg as high as 280° C. were recorded. It is thought that the lower Tg may be the result of some loss of the amine by vaporization before reaction with the monomer.

Tg of the resin specimens produced in accordance with Ex. 2, which represents the preferred embodiment of this invention, reached about 250° C. after curing for 16 hours at 240° C. and increased to about 280° C. and in some instances to 300° C. after curing for 7 hours at 315° C.

It should be noted that results of this invention were achieved with amine salts in amount of less than ½ of the amount of the amine alone when compared to the prior art procedure as demonstrated by Ex. 1, with the additional advantages of a reduced risk of void formation and loss of the amine by evaporation.

Examples 3–10

Cure of bis(3,4-dicyanophenoxy)-4,4'-biphenyl monomer was carried out pursuant to the procedure of Ex. 2 using various curing agents at cure conditions of 16–24 hours at 240° C. and 7-24 hours at 315° C. Some of the curing agents are from the prior art and in that sense, the results given for the invention disclosed herein serve as a comparison of the higher Tg obtained with the curing agents of this invention. Results are given below:

| Curing Agent | Tg, °C. |
|---|---|
| bis(3-aminophenoxy)-1,3-benzene | 256 |
| bis(3-aminophenoxy)-1,3-benzene-p-toluenesulfonate* | 302 |
| p-phenylenediamine-p-toluenesulfonate | 294 |
| bis(4-aminophenyl)methane | 263 |
| bis(4-aminophenyl)methane hydrochloride | 289 |
| N-phenylbenzamidine-p-toluenesulfonate | 304 |
| bis(4-hydroxyphenyl)-2,2-propane | 173 |
| p-toluenesulfonic acid monohydrate | 295 |

*amine and acid added separately

The above results clearly show that the use of the curing agents of this invention yields much higher Tg. This may be attributed to more reacting centers involving both the amine and acid centers relative to only the amine centers as presented in U.S. Pat. No. 4,408,035.

EXAMPLES 11-12

A 75 gram amount of bis(3,4-dicyanophenoxy)-4,4'-biphenyl was degassed at 250° C. for 4 hours in a vacuum. Bis (3-aminophenoxy) - 1,3,benzene and p-toluenesulfonic acid in about stoichiometric ratio were added separately to molten bis(3,4-dicyanophenoxy)-4,4'-biphenyl monomer samples and the mixture was kept at a temperature of 250°-260° C. for thirty minutes while stirring. The molar ratio of the monomer to the curing agent was 100:1. The mixture was then handled as described in Ex. 2. Tg of the final resin was 302° C.

In a separate experiment in which the acid was added at about one-half that required by stoichiometry, with the other conditions being the same, Tg was the same.

EXAMPLE 13

A one gram amount of phthalonitrile monomer was placed in a heavy walled glass tube and 0.05 gm of an amine salt was added. Air was removed from the tube by vacuum and the tube was sealed and placed inside a capped brass tube which was then placed in an oven at 250° C. After 24 hours, the tube was then broken open and the contents analysed for tris(2-cyanophenyl)-1,3,5-triazine, for polytriazines and other polymers, and for unreacted phthalonitrile monomer. Analysis was done using various chromatographic methods to separate the components which were characterized using infra-red and nuclear magnetic resonance spectroscopy.

The experimental work set forth in this example made possible the discovery that the yield of the trimer was about one-half when the curing agent of this invention was used as compared to the free amine bases proposed in U.S. Pat. No. 4,408,035. The rest of the reaction product was polymer in all cases.

Numerous modifications and variations of the present invention are possible in light of the above teachings. It is, therefore, to be understood that within the scope of the appended claims, the invention may be practiced otherwise than as specifically described herein.

What is claimed is:

1. A polymer cured with a curing agent selected from the group consisting of (a) an acid and an amine, (b) a salt of an acid and an amine, and (c) mixtures of (a) and (b), said polymer is prepared from at least one di-phthalonitrile monomer defined as follows:

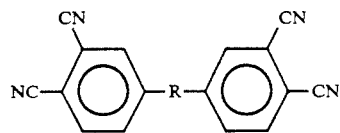

wherein R is selected from the group consisting of a polyether group, a dithioether group, an amide group, an —SAS— group, wherein S is a sulfur atom and A is an aliphatic hydrocarbon group, an ether group, a sulfone group, a halogenated hydrocarbon group, and an oxyaromatic group, said acid is selected from inorganic acids, organic aromatic acids, and mixtures thereof; and said amine is selected from the group consisting of aromatic amines and mixtures thereof.

2. Polymer of claim 1 wherein R is said monomer is a selected from the group consisting of diethoxy of the formula —OR'O— where R' is selected from the group consisting of —ArC$_n$H$_{2n}$Ar—, 1 to 10 —Ar—, —ArC$_3$F$_6$Ar—, —C$_n$H$_{2n}$—, —ArAr—, —ArSO$_2$Ar—, —ArCOAr—, and mixtures thereof, where n is an integer from 2-30 and Ar represents an aromatic group; and alkylene hydrocarbons containing fluorine substituents; said curing agent is selected from the group consisting of said amine and said acid added to said monomer separately, salts of said amine and said acid, and mixtures thereof; said amine is selected from the group consisting of aromatic amines and mixtures thereof; and said acid is selected from the group consisting of organic aromatic acids, strong inorganic acids and mixtures thereof.

3. Polymer of claim 2 having Tg of at least 250° C., wherein in said monomer Ar represents a phenylene group, wherein the curing agent is selected from the group consisting of bis(3-aminophenoxy)-1,3-benzene-1-toluenesulfonate, p-phenylenediamine-p-toluenesulfonate, bis(4-aminophenyl)methane hydrochloride, N-phenylbenzamidine-p-toluenesulfonate, and mixtures thereof; and wherein molar amount of said curing agent is 1-20% relative to said monomer.

4. Polymer having Tg above 250° C. produced by polymerizing at least one di-phthalonitrile monomer with a curing agent selected from the group consisting of (a) an acid and an amine, (b) a salt of an acid and an amine, and (c) mixtures of (a) and (b); said polymer is prepared from a di-phthalonitrile monomer defined as follows:

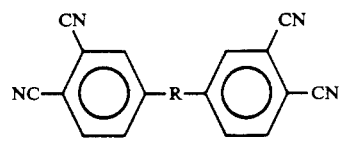

where R contains a polyether group, a dithioether group, an amide group, an —SAS— group wherein S is a sulfur stom and A is an aliphatic hydrocarbon group, an ether group, an either and imide group, a sulfone group, a halogenated hydrocarbon group, and an oxyaromatic group; said acid is selected from the group consisting of inorganic acids, aromatic acids, and mixtures thereof; and said amine is selected from the group consisting of aromatic amines and mixtures thereof.

5. Polymer composition having Tg above 250° C. comprising a polymer and a detectable residue of a curing agent, said polymer is a polymer of a di-phthalonitrile monomer, and said curing agent is selected from the group consisting of (a) and acid and an amine, (b) a salt of an acid and an amine and (c) mixtures of (a) and (b).

6. Composition of claim 5 wherein said polymer is prepared from a di-phthalonitrile monomer as represented by the following structural formula:

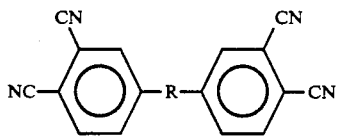

where R is a polyether group, a dithioether group, an amide group, an —SAS— group wherein S is a sulfur atom and A is an aliphatic hydrocarbon group, an ether group, a sulfone group, a halogenated hydrocarbon group; and an oxyaromatic group; said amine is selected from the group consisting of aromatic amines and mixtures thereof; and said acid is selected from the group consisting of inorganic acids, organic aromatic acids, and mixtures thereof.

7. Composition of claim 6 wherein said curing agent is selected from the group consisting of bis(3-aminophenoxy)-1,3-benzene-1-toluenesulfonate, p-phenylenediamine-p-toluenesulfonate, bis(4-aminophenyl)methane hydrochloride, N-phenylbenzamidine-p-toluenesulfonate, bis(4-aminophenyl)methane hydrochloride, N-phenylbenzamidine-p-toluenesulfonate, and mixtures thereof.

8. Method for preparing a polymer comprising:
(i) mixing an effective amount of a curing agent with a di-phthalanitrile monomer, said curing agent is selected from the group consisting of (a) and acid and an amine, (b) a salt of an acid and an amine, and (c) mixtures of (a) and (b); and
(ii) heating said monomer and said curing agent until gelation occurs; prepared from at least one di-phthalonitrile monomer defined as follows:

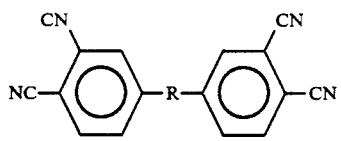

wherein R is selected from the group consisting of a polyether group, a dithioether group, an amide group, an —SAS— group wherein S is a sulfur atom and A is an aliphatic hydrocarbon group, an ether group, a sulfur group, a halogenated hydrocarbon group, and an oxyaromatic group.

9. Method of claim 8 wherein R in said monomer is a selected from the group consisting of diethoxy of the formula —OR'O— where R' is selected from —ArC$_n$H$_{2n}$Ar—, 1 to 10 —Ar—, —ArC$_3$F$_6$Ar——C$_n$H$_{2n}$—, —ArSO$_2$Ar—, —ArCOAr—, and mixtures thereof, where n is an integer from 2-30 and Ar represents an aromatic group; and alkylene hydrocarbons containing fluorine substituents.

10. Method of claim 8 wherein R in said monomer is selected from the group consisting of diethoxy of the formula —OR'O— where R' is selected from —ArC$_n$H$_{2n}$Ar—, 1 to 10 —Ar—, —ArC$_3$F$_6$Ar—, —C$_n$H$_{2n}$—, —ArSO$_2$Ar—, —ArCOAr—, and mixtures thereof, where n is an integer from 6-20 and Ar represents a phenylene group; said acid is selected from toluene sulfonic acids, hydrochloric acid, sulfuric acid, phosphoric acid, nitric acid, and mixtures thereof; and molar amount of said curing agent is 0.1-40% relative to said monomer.

11. Method of claim 10 wherein said curing agent is selected from the group consisting of bis(3-aminophenoxy)-1,3-benzene-1-toluenesulfonate, p-phenylenediamine-p-toluenesulfonate, bis(4-aminophenyl)methane hydrochloride, N-phenylbenzamidine-p-toluenesulfonate, and mixtures thereof; and molar amount of said curing agent is 1-20% relative to said monomer.

12. Method of claim 8 wherein step (ii) comprises heating said monomer initially within the range of about 50° C. above the melting point of said monomer for 1 to 28 hours followed by heating at 280° to 340° C. for 5 to 28 hours.

13. Polymer produced by the method defined in claim 10.

14. Method for preparing a prepolymer comprising:
(i) mixing an effective amount of a curing agent with a di-phthalanitrile monomer, said curing agent is selected from the group consisting of (a) and acid and an amine, (b) a salt of an acid and an amine, and (c) mixtures of (a) and (b); and
(ii) heating said monomer and said curing agent before gelation occurs, said prepolymer is prepared from the monomer defined as follows:

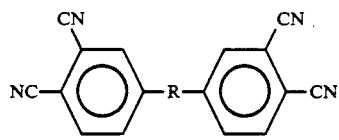

where R contains a polyether group, a dithioether group, an amide group, an —SAS— group wherein S is a sulfur stom and A is an aliphatic hydrocarbon group, an ether group, a sulfone group, a halogenated hydrocarbon group, and an oxyaromatic group; sand acid is selected from the group consisting of inorganic acids, aromatic acids, and mixtures thereof; and said amine is selected from the group consisting of aromatic amines and mixtures thereof.

15. Method of claim 14 comprises the steps of cooling said prepolymer to ambient temperature, storing said prepolymer at ambient temperature, and heating said prepolymer for a time and a temperature until polymer of Tg in excess of 250° C. is produced.

16. Method of claim 15 wherein said step of heating said prepolymer is at a temperature of 280°-340° C. for up to 28 hours.

17. Prepolymer produced by the method defined by claim 14.

* * * * *